United States Patent
Bonacci

(10) Patent No.: US 8,904,921 B2
(45) Date of Patent: Dec. 9, 2014

(54) CAPSULE WITH DEDICATED SEALING MEANS

(75) Inventor: Enzo Bonacci, Savigny (CH)

(73) Assignee: Nestec S.A., Vevey (CH)

( * ) Notice: Subject to any disclaimer, the term of this patent is extended or adjusted under 35 U.S.C. 154(b) by 750 days.

(21) Appl. No.: 12/850,818

(22) Filed: Aug. 5, 2010

(65) Prior Publication Data

US 2011/0186450 A1 Aug. 4, 2011

(30) Foreign Application Priority Data

Aug. 5, 2009 (EP) .................................... 09010131

(51) Int. Cl.
*A47J 31/06* (2006.01)
*A47J 31/36* (2006.01)
*B65D 85/804* (2006.01)

(52) U.S. Cl.
CPC ......... *A47J 31/369* (2013.01); *B65D 2565/385* (2013.01); *B65D 85/8043* (2013.01)
USPC .............................. 99/295; 99/279

(58) Field of Classification Search
USPC ......... 99/279, 287, 295, 300, 302 C, 302 FB, 99/302 R, 305, 307, 323; 426/77, 78, 79, 426/112, 115, 432, 433; 206/0.5, 219
See application file for complete search history.

(56) References Cited

U.S. PATENT DOCUMENTS

| | | | | |
|---|---|---|---|---|
| 4,775,048 A | * | 10/1988 | Baecchi et al. | 206/0.5 |
| 4,944,435 A | * | 7/1990 | Lee | 222/565 |
| 5,402,707 A | | 4/1995 | Fond et al. | |
| 5,897,899 A | * | 4/1999 | Fond | 426/112 |
| 2007/0062375 A1 | * | 3/2007 | Liverani et al. | 99/279 |
| 2007/0224319 A1 | * | 9/2007 | Yoakim et al. | 426/433 |

FOREIGN PATENT DOCUMENTS

| | | | |
|---|---|---|---|
| CN | 101287662 | 10/2008 | |
| CN | 101454227 | 6/2009 | |
| EP | 512470 | 11/1992 | |
| EP | 1849715 | 10/2007 | |
| EP | 1849715 A1 | * 10/2007 | ............. B65D 81/34 |
| EP | 1929904 | 11/2008 | |
| EP | 2070828 | 6/2009 | |
| GB | 1 348 370 | * 5/1975 | ............... B65D 3/00 |

OTHER PUBLICATIONS

European Search Report, Jan. 14, 2010, Appln. No./Patent No. 09010131.2-2308, 5 pages.

* cited by examiner

*Primary Examiner* — Thien S Tran
(74) *Attorney, Agent, or Firm* — K&L Gates LLP

(57) ABSTRACT

The present invention proposes a capsule for containing beverage ingredients, the capsule being designed for insertion in a beverage production device, the capsule comprising a body portion having at least a circumferential sidewall for enclosing an ingredients compartment of the capsule, and a sealing member, wherein the sealing member comprises a first flange-like rim portion and a second portion which is at least partially overlapping with an inner surface of the sidewall of the body portion.

15 Claims, 3 Drawing Sheets

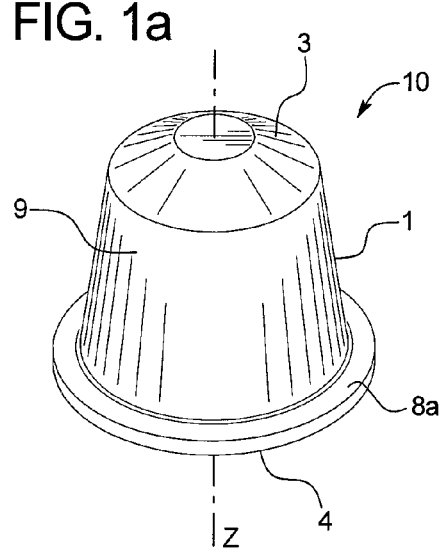
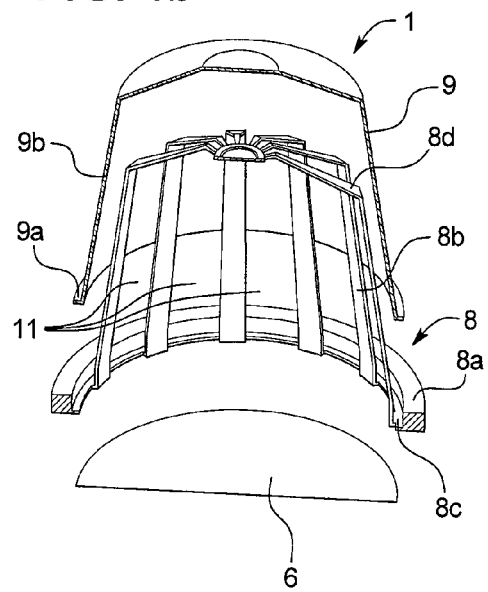
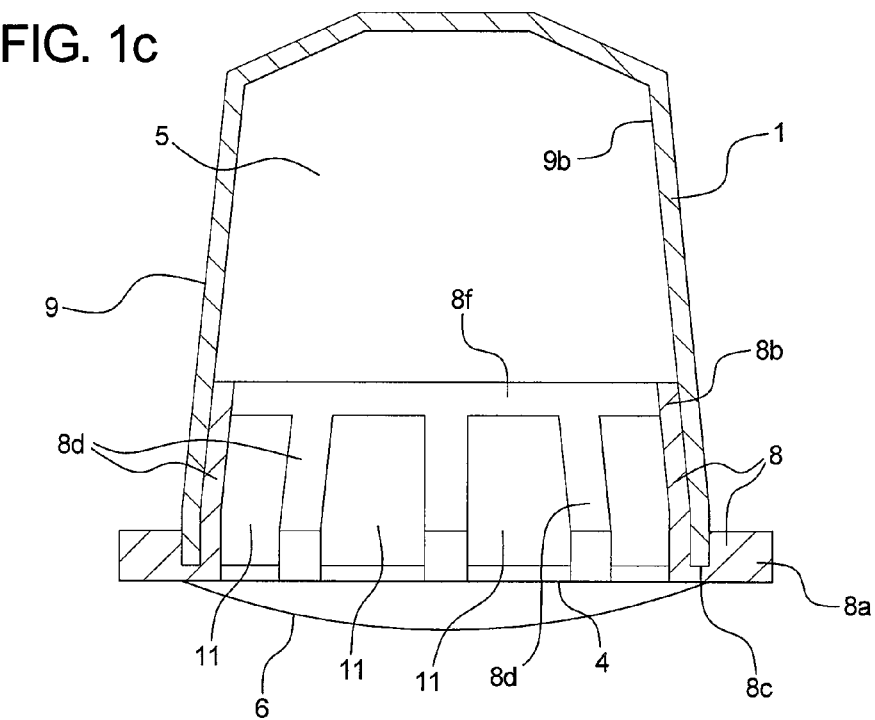

CAPSULE WITH DEDICATED SEALING MEANS

FIELD OF THE INVENTION

The present invention generally relates to the field of capsules for accommodating portioned beverage ingredients. More particularly, the invention relates to a capsule with sealing means as part of the capsule for improving the sealing engagement of the capsule in a beverage producing device.

BACKGROUND

Devices for preparing a beverage by injecting pressurized fluid into a capsule are well-known, especially in the field of producing coffee or coffee type beverages. In addition, other comestible ingredients such as chocolate or milk products can be contained within the capsule. By means of an interaction of these ingredients with a liquid, a beverage such as coffee, tea or other comestibles, such as for example soup, can be produced. The interaction can be for example an extraction, brewing, dissolution, etc. process. Such a capsule is particularly adapted to contain ground coffee in order to produce a coffee beverage by having hot water under pressure enter the capsule and draining a coffee beverage from the capsule.

Systems and methods for obtaining fluid comestibles from substances containing capsules are for example known from EP-A-512470 (counterpart of U.S. Pat. No. 5,402,707).

The principle of the extraction process as described in the prior art can be summarized as follows.

A capsule filled with beverage ingredients is inserted in a dedicated chamber of the system in which water injection means are provided which enable to inject water into the capsule. In the chamber, dedicated opening means are provided which generate at least one opening in a first wall of the capsule. Accordingly, water entering the capsule through the opening in a first wall is made to interact with ingredients contained in the capsule while traversing the interior of the capsule and is then made to leave the capsule through at least one opening/perforation provided in a second wall of the capsule. As a result of the interaction between water and the ingredients in the capsule, a beverage or other comestible can be produced.

It has been found that during a lifecycle of a beverage preparation device to be used in conjunction with such a capsule, irregularities such as a slightly different closing force due to bearing play or even small ridges or grooves in a dedicated enclosing member of such a device are likely to be present respectively to occur. Moreover, irregularities may also be provided on purpose for facilitating removal of the capsule from the beverage producing device and/or improving the force distribution on the capsule and reducing the force required for closing the device onto the capsule. Hence, small 'leaks' may be present during the enclosure of a capsule in a dedicated beverage producing device. Thereby, any 'leak' at the exterior of the capsule reduces the pressure build-up inside the capsule. On the other hand, it is well known that a sufficient extraction pressure is a key factor for the quality of espresso-style coffee.

Accordingly, different pressure drops within the capsule may occur if the capsule is used in conjunction with different beverage production devices. This however might not be easily anticipated by the user and it however will negatively affect the sealing properties of the dedicated enclosing members of a beverage production device.

Therefore, the present invention aims at providing enhanced sealing properties for such a capsule in order to compensate for different kinds of pressure drops within the capsule and thus, enable effective sealing of the capsule during beverage preparation.

From the prior art sealing means provided at a capsule to be used in conjunction with a beverage production device are already known. In general, these capsules have sealing means additionally applied to an outer surface of the capsule. However, said sealing means suffer the disadvantage that they are not sufficiently integrated to the structure of the capsule and potentially protected from external constraints. Consequently, the sealing effect at the end can be affected. For example, the sealing means can be peeled off from the capsule body due to external influence or wear and tear. The capsule may also show quality issues during mass production, for example, forming seal thicknesses having inconsistent sizes and shapes. Accordingly, a capsule sealing arrangement is sought-after which does not suffer said disadvantage.

SUMMARY

In a first aspect, the present invention proposes a capsule for containing beverage ingredients, the capsule being designed for insertion in a beverage production device, the capsule comprising a body portion having at least a circumferential sidewall for enclosing an ingredients compartment of the capsule, and a sealing member, wherein the sealing member comprises a first flange-like rim portion and a second portion; wherein the second portion is at least partially overlapping with an inner surface of the sidewall of the body portion. Preferably, the second portion covers only partially the inner surface of the body portion.

The sealing member according to the invention enables to compensate for irregularities provided at a matching surface of an enclosing member of a dedicated beverage production device. Hence, irregularities such as e.g. grooves, gaps or fractures (whether obtained by design or due to wearing) can be effectively sealed due to the sealing member. Accordingly, the capsule can be adapted to be used with a large variety of different beverage preparation devices.

In a preferred embodiment, the second portion of the sealing member is connected to the inner surface of the sidewall of the body portion. Accordingly, the sealing member is connected to the capsule body portion from the inside and thus, the connection between sealing member and body portion of the capsule is not subjected to environmental influences which may negatively affect the established connection.

The second portion of the sealing member is connected to the capsule body portion by means of adhesive or a welding. Welding includes injection moulding, in-mould labelling or thermoforming. The adhesive means are to be understood as being an interposition of an intermediate adhesive layer between the two elements. Therefore, it can be a liquid adhesive or fusible solid adhesive such as a thermofusible film.

The sealing member is preferably made from plastics, rubber, paper, cardboard or silicone. The sealing member is preferably made by injection moulding.

Thereby, the first flange-like rim portion is preferably integrally formed with the second portion of the sealing member. In this case, the sealing member can be made entirely softer than the body portion. The body portion helps maintaining the rigidity to the capsule. In particular, the body maintains rigidity and avoids collapsing of the capsule structure during the operation piercing of the capsule for introduction of water.

In an embodiment, the first flange-like rim portion of the sealing member is made of a softer material than the body portion. By "softer" it is meant that the portion is made of a material having a lower hardness (e.g., shore A hardness).

Preferably, the sealing member has a hardness of less than about 100 shore A, e.g., between 40 and 100 shore A. Preferably, the body portion has a hardness higher than 80 shore A. For instance, the sealing member is made of a soft plastic and the body portion is made of a harder plastic.

For example, the sealing member and the body portion can be made of the same plastic material but of different hardnesses.

In an embodiment, the flange-like rim portion and the second portion of the sealing member differ in hardness (i.e., shore-A hardness). Thereby, the rim portion is preferably a resilient portion and designed for compensating eventual irregularities in a matching sealing surface of a beverage production device.

The rim portion is preferably compressible so that the sealing engagement is obtained by the matching surface of the beverage production device exerting a positive pressure force on the sealing member, from a first uncompressed thickness of the flange-like rim portion to a second compressed thickness thereof. The flange-like rim portion of the sealing member may as well be bendable so that it can exert a biasing force against the matching pressing surface of the beverage production device. The rim portion may as well be a hollow member respectively a member of solid material comprising gas inclusions.

The flange-like rim portion of the sealing member preferably comprises a rectangular-shaped cross-section when seen in a cross-sectional view. Alternatively, the sealing member may comprise a different cross-section, such as e.g. a semicircular or corrugated profile, for adapting to specific needs regarding the sealing characteristics of the capsule with different beverage preparation devices.

Preferably, at least the flange-like rim portion of the sealing member is circumferentially arranged in a continuous manner around the body portion of the capsule. Hence, the cross-section of the flange-like rim portion of the sealing member is preferably of equal size over the whole circumference of the cup-shaped base body. However, the cross-section of the sealing member may as well vary, over its circumference, for adapting the sealing member to specific embodiments of a dedicated enclosing Member of a beverage preparation device.

In a preferred embodiment, the second portion of the sealing member is connected to the capsule body portion by means of an adhesive or a welding technique. In particular, the overlapping sections respectively areas of the second portion of the sealing member and the inner surface of the sidewall of the body portion are connected. Accordingly, a stable connection between the sealing member and the body portion of the capsule is obtained. However, the body portion of the capsule may as well be connected to both the flange-like rim portion and the second portion of the sealing member.

In a preferred embodiment, the second portion of the sealing member is a support skeleton supporting at least a portion of the side wall of the capsule body portion. Thereby, the support skeleton preferably comprises axial and/or transversal links forming a plurality of windows being covered by the capsule body portion.

The body portion of the container can be an in-mould label connected to the support skeleton. Thereby, as the capsule is essentially made of a support skeleton and a thinner in mould label for closing the larger surfaces of the capsule, the ratio of rigidity to weight of the capsule can be drastically increased. Preferred materials for the support skeleton are PP, RPP, PE plastics. Degradable plastics may also be used such as starch-based polymers and thermoplastics containing a degrading agent. The plastic may be biodegradable and/or degradable under light, oxygen or water. An example of biodegradable plastic is poly-lactic acid. However, other plastic materials may be found appropriate for bonding to the in-mould label by means of injection moulding.

The in-mould label is preferably made of plastic materials such as PP or a multilayer comprising at least one plastic layer such as PP and at least one barrier layer such as EVOH, aluminum, aluminum oxide (AlOx), SiO2, polyamide. Furthermore, the label may also comprise resin layer(s) for decorative purpose such as on its outer surface. The in-mould label may be of multilayered design and thus comprise several layers of different plastic material arranged above each other. One of these layers is preferably a gas barrier layer such as EVOH. Accordingly, transfer of gases such as water vapour, carbon dioxide, oxygen and nitrogen through at least the portions of the capsule which are covered by the in-mould label can be prevented. Moreover, the weight of the capsule is minimized by at the same time maintaining the sealing functions thereof.

The thickness of the in-mould label is preferably between 20 and 200 pm, more preferably between 50 and 120 pm. Thereby, at the window portions of the support skeleton which are covered by the in-mould label, the in-mould label preferably constitutes the only outer wall of the capsule.

The support skeleton may be designed to be easily compacted by e.g. twisting or compressing the container in one or more privileged directions. The skeleton can thus be designed for providing a lesser resistance to compression in at least one privileged direction such as by providing an easy bendable or breakable skeleton, for example by specially oriented links and/or zones of reduced thickness and/or weakened areas. Accordingly, enhanced recycling properties of the capsule can be obtained. In a possible mode, the support skeleton may therefore comprise predetermined weakened zones such as e.g. grooves or recessions at which the links of the support skeleton are bent or broken when compressing, twisting or pinching the container by a dedicated device or a human operator for example.

According to an embodiment, at least the sidewall of the capsule is essentially formed by the in-mould label. Thereby, the term 'essentially' is to be understood as that most of the surface of at least the outer sidewall of the capsule is constituted by the in-mould label only.

Thereby, the rigid support skeleton only supports the in-mould label from being largely deflected and thus, a very thin, light and gas-tight outer surface of the container is obtained.

Other techniques are possible for assembling the sealing member to the body portion, in particular, co-injection or thermoforming.

The capsule according to the present invention further comprises an inlet face integrally formed with the body portion and an outlet face being connected to the flange-like rim portion. Thereby, the outlet face is preferably a gas impermeable membrane connected to the capsule for sealing the ingredients compartment. The impermeable membrane is preferably designed to tear against relief effect of the fluid under pressure building in the capsule during extraction. For this, the membrane is preferably an aluminum membrane having a thickness of between 10 and 120 microns, preferably between 20 and 50 microns.

In a possible mode, the outlet face can comprise a liquid permeable wall such as a filter. The filter can be placed in addition to the gas impermeable membrane or in place of it. For example, the outlet face has a filter made of a piece of paper filter or a plastic screen or a combination thereof. The filter has orifices sufficiently small to retain the coffee or tea particles or bits in the capsule while letting the liquid extract pass through the face.

In a second aspect, the present invention proposes a beverage production system, comprising a capsule according to the present invention, and a beverage production device designed for accommodating the capsule in a brewing chamber, wherein the brewing chamber is defined at least partially by a capsule enclosing member having a front surface with irregularities, such as grooves, the front face of the enclosing member cooperating with the sealing member of the capsule.

In a preferred embodiment, the irregularities in a matching sealing surface of a beverage production device are radially oriented grooves.

The described capsule enables an effective interaction between a capsule according to the present invention and a dedicated beverage production device which is designed to provide a heated and pressurized liquid to the interior of prepared by a beverage production device without any leakage of the capsule.

Additional features and advantages are described herein, and will be apparent from the following Detailed Description and the figures.

BRIEF DESCRIPTION OF THE FIGURES

FIG. 1a shows a capsule according to the present invention in perspective side view.

FIG. 1b shows an exploded assembly drawing of the capsule according to FIG. 1.

FIG. 1c shows a cross sectional side view of the capsule according to another preferred embodiment.

DETAILED DESCRIPTION

Figure 2:
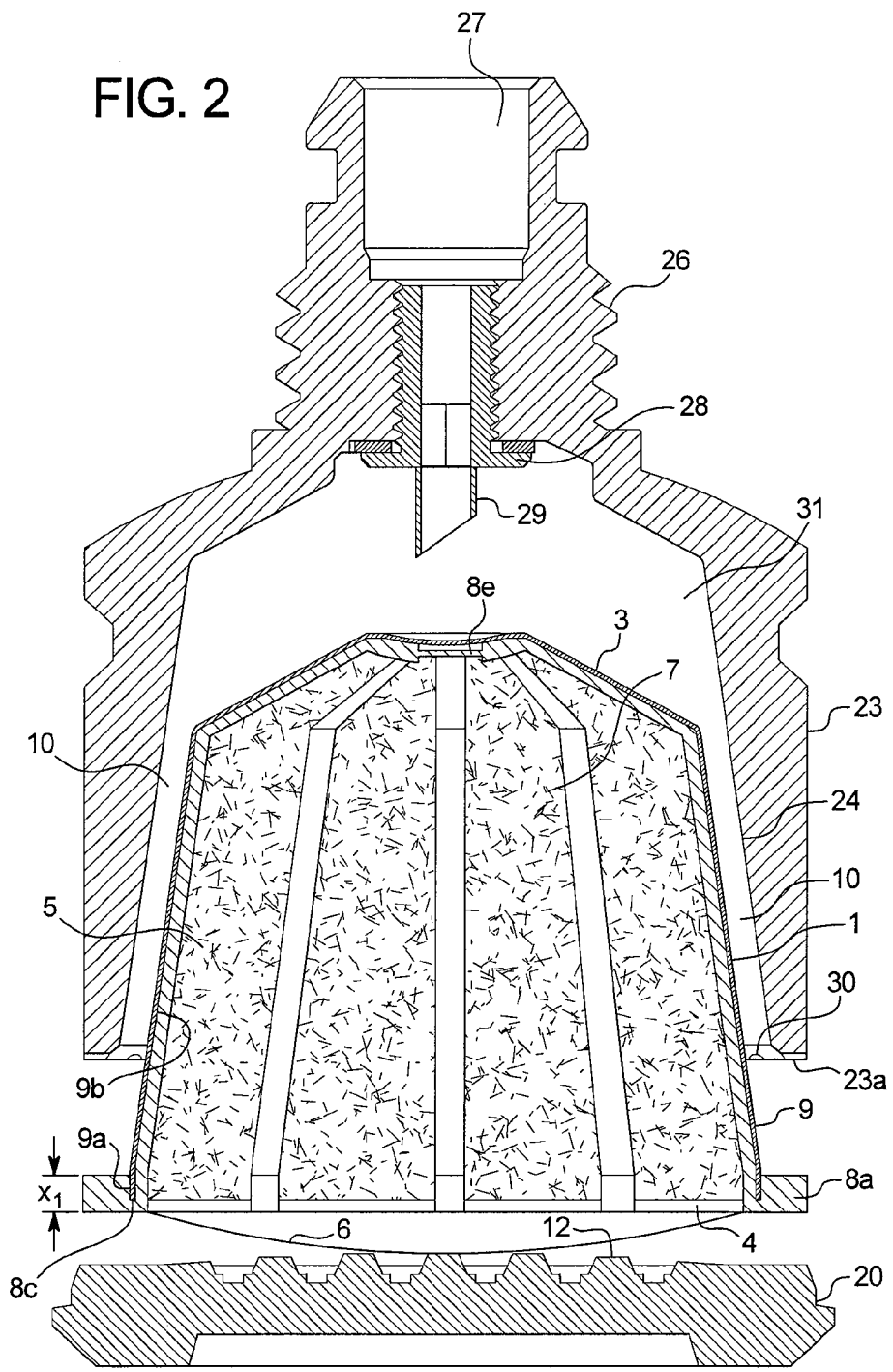
FIG. 2 shows a capsule according to the present invention placed into a dedicated enclosing member of a beverage production device.

FIG. 1a shows the capsule according to the present invention in perspective side view. The capsule 10 has a preferably frustoconical body portion 1 which comprises an aperture 4 provided at an outlet face of the capsule, opposite to the inlet face 3 thereof. Thus, the body portion 1 forms an ingredients compartment 5 (see FIG. 1c) which is filled with ingredients such as ground coffee or tea. In order to enclose such ingredients within the ingredients compartment 5, a membrane 6 is provided (see FIG. 1c) which covers aperture 4 of the capsule 10.

The body portion 1 of the capsule preferably forms a single member comprising a sidewall 9 and the inlet face 3, which can be obtained by plastic injection moulding or a deep drawing process. As illustrated, the body portion 1 can comprise an inlet face which is void of any opening thereby forming an initially closed entry side. Alternatively, the body portion has openings for facilitating the piercing/cutting of the water injection orifices through the inlet face. The body portion 1 may as well be constituted by an in-mould label.

As can be seen in FIG. 1b, the capsule further comprises a sealing member 8 which is connected to the body portion 1. The sealing member 8 preferably comprises a first flange-like rim portion 8a and a second portion 8b. Thereby, the second portion preferably overlaps with an inner surface 9b of sidewall 9 of the body portion 1 in sideview. Hence, at least a part of the second portion 8b is arranged to be connected from the inside to the sidewall 9 of the capsule. Accordingly, the sealing member 8 is connected to the capsule body portion 1 from the inside and thus, the connection between the respective parts is not subjected to environmental influences which may negatively affect the established connection.

The flange-like rim portion 8a and the second portion 8b are preferably formed as an integral part, e.g. by means of injection moulding.

The flange-like rim portion 8a can be softer and, eventually of higher resilience, than the second portion 8b in order to compensate for eventual irregularities in a matching sealing surface of a beverage production device. The flange like rim may also be of a softer material but which plastically deforms to compensate the irregularities during closure.

Preferably, the flange-like rim portion 8a of the sealing member 8 is made from rubber-elastic material. Moreover, the full sealing member can be made of rubber-elastic material. The term 'rubber-elastic' means any suitable material having rubber elasticity including but not limited to elastomers, silicones, soft plastics, latex, balata or others.

As can be seen in FIG. 1b and 1c, between the resilient rim portion 8a and the second portion 8b, a circumferential support groove 8c is provided to which edge 9a of the body portion 1 of the capsule can be connected by means of an adhesive or a welding technique for example. Accordingly, the body portion 1 can be fixedly connected to the rim portion 8a and/or the second portion 8b of the sealing member 8.

In an embodiment according to FIG. 1b, the second portion 8b of the sealing member 8 forms a rigid support skeleton comprising a plurality of links 8d being arranged adjacent to the inner surface 9b of the side wall 9, thereby supporting the body portion 1 of the capsule.

In accordance with a possible mode of the invention, the body portion 1 is an in-mould label connected to the links 8d of the skeleton by means of an in-mould labelling process. Thereby, the links 8d particularly serve the purpose of providing a support or frame of controlled rigidity and hardness for the rather flexible in-mould label. Thereby, the skeleton may comprise links of any geometrical shape designed to support the in-mould label. In general, the thickness of the links is comprised between 0.1 and 5 mm and the width of the links comprised between 2 and 10 mm.

As can be seen in FIG. 1b and 1c, the links 8d form a plurality of windows 11 being covered by the sidewall 9 of the capsule body portion 1. Thereby, the links may comprise axial and/or transversal links. The terms 'axial' or 'transversal' do not necessarily mean a direction purely parallel or orthogonal to a longitudinal axis of the body portion but these directions may be inclined relative to the longitudinal axis z see FIG. 1a or to the orthogonal to this axis.

For enclosing of the ingredients provided to the ingredients compartment 5, a membrane 6 is provided. The membrane 6 is preferably a foil member and is sealed to the flange-like rim portion 8a of the capsule 10 to hermetically close-off the body portion 1. In an alternative, the membrane is a liquid permeable wall such as a filter.

As can be seen in FIG. 1c which refers to another preferred embodiment of capsule 10, the second portion 8b of sealing member 8 comprises a plurality of axial links 8d joined by a circumferential link 8f. Thereby, said circumferential link 8f is preferably arranged within the lower half of the capsule body portion 1 as depicted in FIG. 1c.

The links 8d, 8f are connected to the inner surface 9b of sidewall 9 of the capsule body portion 1. Thereby, the body portion 1 can be made of plastic or aluminum in order to provide a more rigid capsule body portion than the capsule body portion as explained with reference to FIG. 1b. Accordingly, the body portion 1 does not need to be fully supported by links 8d, 8f. In this case, the body portion is made of a harder, more rigid material than the sealing member.

As shown in FIG. 2, the membrane 6 of capsule 10 is placed on a capsule holder 20 of the beverage production device having relief elements 12 which are designed to tear foil member 6 closing off the cup-like base body 1 of the capsule 10. This tearing of the foil member can e.g. occur as soon as the pressure inside the capsule exceeds a threshold value. Note that the relief elements can have any protruding shape able to cause a (partial) tearing of the foil member. As an example only pyramids, needles, bumps, cylinders, elongated ribs are cited.

Note that the foil member 6, when formed by a gas impermeable membrane, as shown is not exactly flat due to a defined over pressure inside the capsule, which over pressure is generated by introducing e.g. a protective gas when producing the filled capsule.

Within the capsule 10 ingredients 7 are contained, wherein the ingredients 7 are selected such that a beverage can be produced when having a liquid entering the capsule in the region of the top wall respectively the inlet face 3 of the capsule 10 and then interact which such ingredients 7. Preferred ingredients are e.g. ground coffee, tea or any other ingredients from which a beverage or other liquid or viscous comestible (e.g. soup) can be produced.

The body portion 1 of the capsule 10 is already partly surrounded by the circumferential wall 24 of an enclosing member 23 of the beverage preparation device. The shown enclosing member 23 has the shape of a bell. However, other shapes are viable, wherein the design of the interior contours (recess) of the enclosing member 23 is generally adapted to substantially match the contours of the capsule 10.

The enclosing member 23 may comprise an external thread 26 for mounting the enclosing member in a beverage preparation device and a water inlet opening 27 for feeding a liquid such as for example hot water under pressure to a water injector 28 which is releasable mounted, e.g. screwed, to the enclosing member 23.

It should be noted that the shown thread 26 is just an example for connection means and therefore, any other releasable or permanent connection means may be used to connect the enclosing member 23 to a beverage production device.

The other components of the beverage production device, such as e.g. the mechanism for displacing the enclosing member 23 and eventually also the capsule holder 20 are known from the prior art in the field of capsule-based espresso machines.

Moreover, the water injector 28 preferably comprises opening means 29 for opening a face of the capsule 10. Such opening means 29 may for example be a perforation element such as a blade, pin, etc. designed to produce an opening in inlet face 3 of the capsule 10 when the capsule holder 20 and the enclosing member 23 are moved close together e.g. by a manually operated or a automatic mechanism. According to this, a liquid such as water can be fed to the interior of the capsule 10 once the perforation element 29 protrudes into the interior of the capsule 10.

As depicted in FIG. 2, the enclosing member 23 and in particular the front surface respectively the matching surface 23a which is designed to press against the capsule holder 20 in order to enable an enclosing of the capsule 10 within a brewing chamber 31 may comprise irregularities such as for example radially oriented grooves 30. Said irregularities 30 may be present at the whole circumference as indicated in FIG. 2 or only at partial regions thereof. For instance, a plurality of radial grooves (forming potential air and/or liquid passages when not compensated by the sealing member) at the matching surface 23a, are distributed along the circumference at regular intervals. The irregularities may be present due to wear and tear during the lifecycle of the beverage preparation device.

Moreover, such irregularities may constitute release means for releasing the capsule 10 after the injection of liquid thereto. Said release means 30 prevent a 'vacuum effect' enclosed by the enclosing member 23 and the capsule holder 20. The material of the enclosing member is also preferably chosen to reduce its friction and/or adherence with the capsule. Accordingly, when the capsule holder 20 is opened, the risk that the capsule 10, instead of falling down, remains sucked into the enclosing member 23 due to a 'vacuum effect' can be avoided. Preferably, said release means 30 are apertures or recesses provided at the circumference of the lower edge 23a of the enclosing member 23 such that air can get into the space between the inlet face 3 and the side wall portions 14 of the capsule 10 and the inner wall 23b of the enclosing member 23, respectively.

As can be seen in FIG. 2, the enclosing member 23 according to this embodiment does not comprise any dedicated resilient sealing member. However, the enclosing member 23 optionally can also comprise a resilient sealing member which may be arranged at the matching sealing surface 23a.

Figure 3:
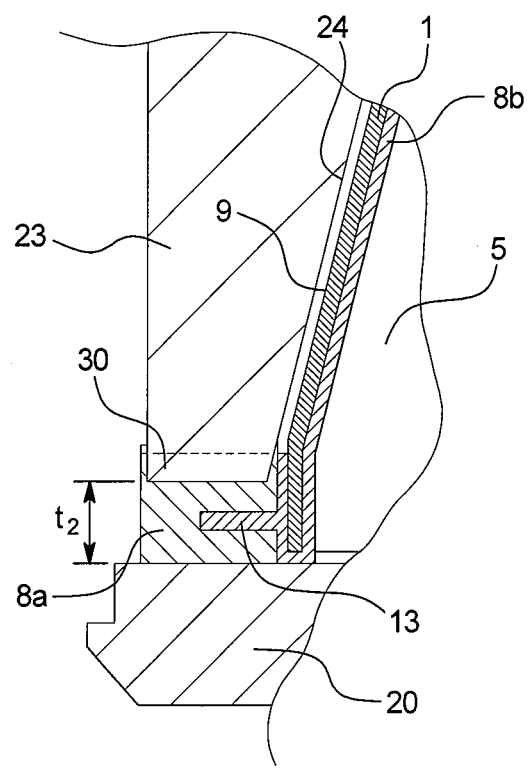
FIG. 3 shows the interaction of the enclosing member and the sealing member of the capsule during a beverage preparation process.

FIG. 3 relates to the interaction of the sealing member 8 and the enclosing member 23 of a beverage production device. As can be seen in the figure, the rim portion 8a of the sealing member 8 which has been provided to the capsule 10 is compressible. Accordingly, when the enclosing member 23 and the capsule holder 20 (see FIG. 2) are brought into a position to enclose the capsule 10, a lower edge 23a of the enclosing member 23 is pressed against the rim portion 8a of the sealing member 8.

In the enclosed state of the capsule 10, the enclosing member 23, the rim portion 8a and the capsule holder 20 are positioned in a sandwiched, respectively, stacked arrangement in sectional side view with respect to each other.

Due to the compressing force exerted by the enclosing member 23 the rim portion 8a is compressed from a first thickness t1 (see FIG. 2) to a second thickness t2 as indicated in FIG. 3. Thereby, thickness t1 of the uncompressed rim portion 8a is preferably comprised between 0.8 and 2.0 mm. In the compressed state, the thickness t2 of the rim portion 8a is preferably comprised between 0.2 and 1.0 mm.

The flange-like rim portion 8a preferably comprises a rectangular-shaped cross-section. However, the rim portion 8a may as well be of different polygonal form. The cross-section of the flange-like rim portion is preferably constant over the whole circumference of the capsule 10. However, the cross-section may as well vary over the circumference.

The rim portion 8a of the sealing member 13 is preferably made from solid material. Moreover, the rim portion 8a may at least be partially hollow. Thereby, air respectively gas inclusions (not shown) may be present within the rim portion 8a. Hence, the flexibility of the rim portion 8a can be adjusted. Moreover, the expansion behavior of the sealing portion when pressure is applied e.g. by means of enclosing member 23 of a dedicated beverage preparation device can be further adapted. Thereby, gas inclusions of different sizes may be present in the material of the rim portion 8a in order to adapt the sealing properties of the capsule to given needs without amending the exterior shape of the rim portion 8a.

The flange-like rim portion 8a and the second portion 8b of the sealing member 8 may be connected by means of connecting pins 13 which are preferably integrally formed with the second portion 8b. Accordingly, the flange-like rim portion 8a can be fixedly connected to the second portion 8b of the sealing member 8 which in turn enables a stable connection to the inner surface 9b of the side wall 9 of the capsule. The connecting pins 13 are preferably radially extending from a lower end of the second portion 8b as indicated in the figure. Preferably, the connecting pins are arranged to extend towards a centre portion of the rim portion 8a when seen in side view. Accordingly, the flexibility of the flange-like rim portion 8a is maximized while at the same time a stable support of the rim portion 8a at the second portion 8b of the sealing member 8 is enabled.

In the closure state of the enclosing member 23, the sealing member 8 enables sealing of the irregularities 30 provided at the lower edge 23a of the enclosing member 23. In particular, due to the compression of the sealing member 8, irregularities such as e.g. grooves or recesses in the enclosing member 23 can be effectively covered and thus, effective sealing is obtained. Accordingly, no liquid may by-pass the capsule 10 through said grooves or recesses 30.

If water is injected to the capsule 1 by means of the injector 28 (see FIG. 2), pressurized liquid may be present between an inner wall 24 of the enclosing member 23 and the side wall portion 9 of the capsule 10. Due to the interaction of the lower edge 23a with the sealing member 8 provided to the capsule 10, said pressurized liquid is however prevented from by-passing the capsule 10.

Accordingly, effective sealing of the capsule 10 during the beverage production process is obtained.

During the shown closing pressure engagement of the enclosing member 23, the cup holder 20 and the capsule 10, water entering the interior of the capsule 10 by means of an opened inlet face 3 builds up pressure inside the capsule. Accordingly, water entering the capsule is able to interact with the provided beverage ingredients 7 in order to form a liquid comestible. Due to the pressure built up within the capsule, the relief members 12 of the capsule holder 20 produce openings in the membrane 6 of the capsule 1. Hence, the beverage produced from the ingredients 7 contained in the capsule can be drained in small interstices between the relief members 12 and the surrounding foil member 6. Thereby, due to the sealing member 8 liquid provided to the capsule 10 can only flow through the capsule 10, but not at the exterior of the capsule. Accordingly, effective sealing of the capsule is enabled.

Although the present invention has been described with reference to preferred embodiments thereof, many modifications and alternations may be made by a person having ordinary skill in the art without departing from the scope of this invention which is defined by the appended claims.

For example, the invention is explained referring to a certain design of a capsule, i.e. a design according to which the capsule comprises a cylindrical or frusto-conical body portion. However, it is to be understood that other designs of the capsule are viable. Generally a capsule according to the present invention comprises at least two opposing wall members which are connected to each other at the edges to form a sealed flange-like rim area, thus enclosing a defined compartment in the interior of the capsule.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A capsule for containing beverage ingredients, the capsule being designed for insertion in a beverage production device comprising:
   a body portion having an inlet face, at least a circumferential sidewall for enclosing an ingredients compartment of the capsule, and an aperture;
   a sealing member comprising a first flange-like rim portion, a second portion, and a circumferential support groove therebetween, the first flange-like rim portion being one piece distinct from the body portion and made of a sealing material softer than the body portion, the second portion being at least partially overlapping with an inner surface of the sidewall of the body portion, and the circumferential support groove being connected to an edge of the body portion; and
   a membrane forming an outlet face covering the aperture and being sealed to the first flange-like rim portion of the sealing member.

2. The capsule according to claim 1, wherein the second portion of the sealing member is connected to the capsule body portion by means selected from the group consisting of an adhesive and a welding.

3. The capsule according to claim 1, wherein the first flange-like rim portion is integrally formed with the second portion of the sealing member.

4. The capsule according to claim 1, wherein the rim portion and the second portion of the sealing member have a different hardness.

5. The capsule according to claim 1, wherein the rim portion is resilient to compensate for eventual irregularities in a matching sealing surface of a beverage production device.

6. The capsule according to claim 1, wherein the flange-like rim portion is designed to be compressed from a first thickness to a second thickness.

7. The capsule according to claim 1, wherein the membrane is a gas impermeable membrane.

8. The capsule according to claim 1, wherein the outlet face has a liquid permeable wall.

9. The capsule according to claim 1, wherein the second portion of the sealing member is a support skeleton supporting at least a portion of the side wall of the capsule body portion.

10. The capsule according to claim 9, wherein the support skeleton comprises at least one of axial links or transversal links forming a plurality of windows covered by the sidewall of the capsule body portion.

11. The capsule according to claim 1, wherein the flange-like rim portion is made of a material selected from the group consisting of plastic, rubber and silicone.

12. A beverage production system, comprising:
   a capsule for containing beverage ingredients, the capsule being designed for insertion in a beverage production device, the capsule comprising a body portion, a sealing member, and a membrane, the body portion having an inlet face, at least a circumferential sidewall for enclosing an ingredients compartment of the capsule, and an aperture, the sealing member comprising a first flange-like rim portion, a second portion, and a circumferential support groove therebetween, the first flange-like rim portion being one piece distinct from the body portion and made of a sealing material softer than the body portion, the second portion being at least partially overlapping with an inner surface of the sidewall of the body portion, the circumferential support groove being connected to an edge of the body portion, and the membrane forming an outlet face covering the aperture and being sealed to the first flange-like rim portion of the sealing member; and the beverage production device is designed for receiving the capsule in a brewing chamber, the brewing chamber is defined, at least partially, by a capsule enclosing member having a front surface with irregularities, the front face of the enclosing member cooperating with the sealing member of the capsule.

13. Beverage production system according to claim 12, wherein the irregularities in a matching sealing surface of a beverage production device are radially oriented grooves.

14. The capsule according to claim 1, wherein the first flange-like rim portion and the second portion of the sealing member are connected by radially extending connecting pins.

15. Beverage production system according to claim 12, wherein the first flange-like rim portion and the second portion of the sealing member are connected by radially extending connecting pins.

* * * * *